Dec. 9, 1952 J. E. DIENES 2,620,579
ADVERTISING SIGN HOLDER FOR AUTOMOBILES
Filed Aug. 17, 1950
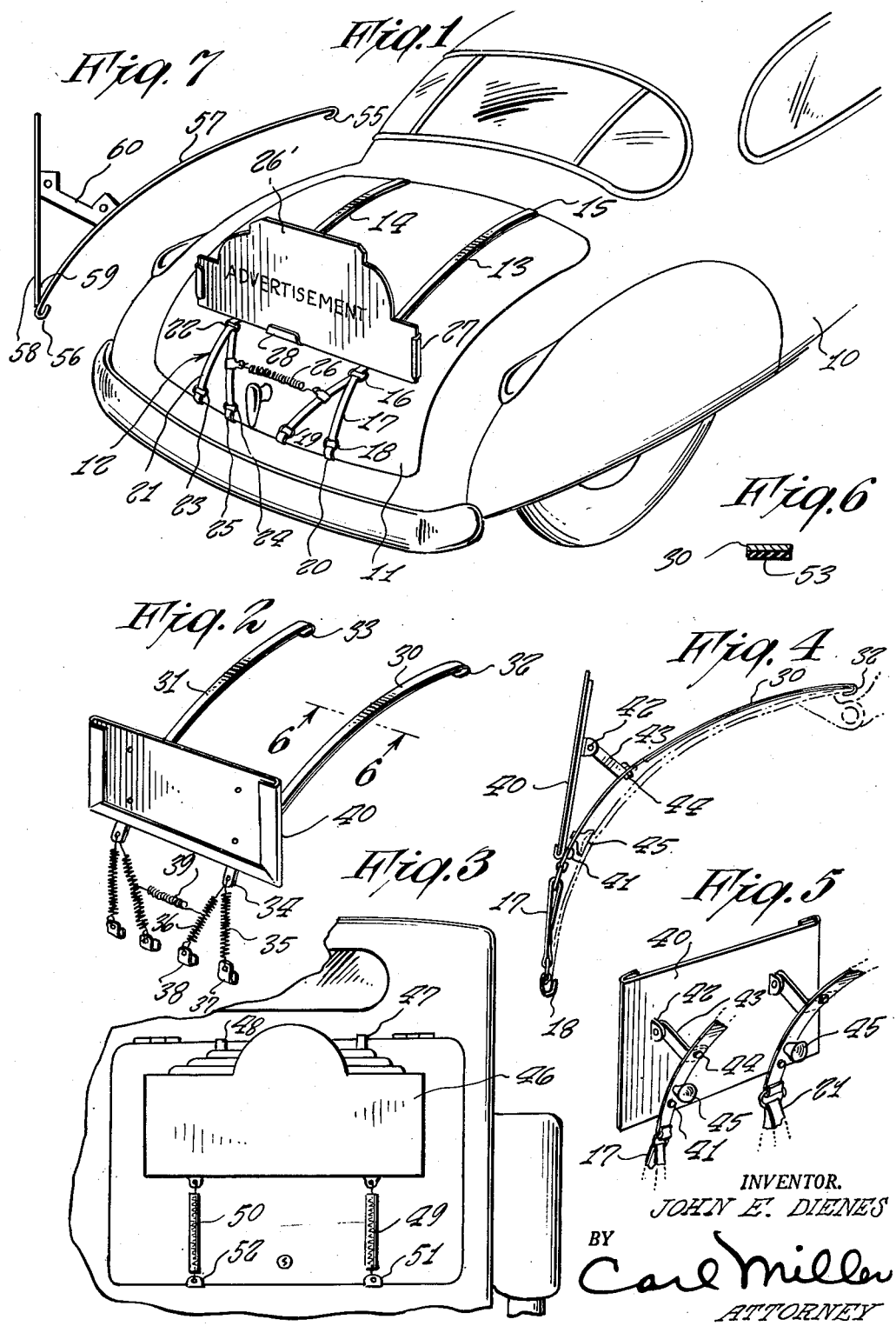
INVENTOR.
JOHN E. DIENES
BY Carl Miller
ATTORNEY Patented Dec. 9, 1952

2,620,579

UNITED STATES PATENT OFFICE 2,620,579

ADVERTISING SIGN HOLDER FOR AUTOMOBILES

John E. Dienes, Wayne, Mich.

Application August 17, 1950, Serial No. 179,942

1 Claim. (Cl. 40—129)

This invention relates to an advertising sign holder for automobiles.

It is an object of the present invention to provide an advertising sign holder for automobiles which can be quickly and easily attached to the back cover of the automobile and in a manner so as not to scratch or damage the back cover surface and wherein the advertisement will be held in a vertical manner or on a slant on the trunk cover.

Other objects of the present invention are to provide an advertising sign holder adapted to be connected to the trunk cover of an automobile which is of simple construction, inexpensive to manufacture, easy to install and remove, has a minimum number of parts, easy to store when not in use, compact and efficient in operation.

For other objects and for a better understanding of the invention, reference may be had to the following detailed description taken in connection with the accompanying drawing, in which Fig. 1 is a perspective view of the rear of an automobile with the advertising sign holder constructed according to one form of the invention attached to the trunk cover.

Fig. 2 is a perspective view of a slightly different form of holder.

Fig. 3 is a rear elevational view of still a different form of holder, attached to the trunk cover of an automobile, and particularly on an automobile of an older type.

Fig. 4 is a side elevational view of the holder constructed according to a still further form of the invention.

Fig. 5 is a fragmentary perspective view looking upon the inner side of the holder shown in Fig. 4.

Fig. 6 is a sectional view taken on line 6—6 of Fig. 2.

Fig. 7 is a side elevational view of a still further form of the invention.

Referring now particularly to Fig. 1, 10 represents an automobile having a trunk cover 11 on which is placed holder 12 of the one form of the invention. This holder has metal straps 13 and 14 which are preferably lined with rubber or felt so as not to damage the finish on the trunk cover. The strap 13 has hook formation 15 engaging with the upper edge of the trunk cover and at its lower end has a loop 16. Connected to this ring is an elastic member 17, the ends of which have rings 18 and 19 respectively. To each of the rings 18 and 19 there is connected a hook 20 which sits under the lower edge of the trunk cover 11.

The strap 14 is similarly constructed and has a flexible and stretchable rubber strip 21 extending through a ring 22 and which has on its lower ends rings 23 and 24 carrying respectively hooks 25. The inner legs of the flexible strips 17 and 21 are connected together by a tension spring 26. Extending upwardly from the straps is a backing plate 26' having holder flanges 27 at the side and a bottom flange 28 adapted to receive a card or the like. The holder plate 26' is held in a vertical position, as shown in Fig. 5.

Referring now particularly to Fig. 2, there is shown another form of the invention wherein straps 30 and 31 are connected to the upper edge of the trunk cover by their hook formations 32 and 33. The under surfaces of the straps 30 and 31 are provided with a rubber or felt strip to protect the finish on the cover.

The lower ends of the straps 30 and 31 have holes 34 therein and through these holes there are extended wires of tension springs 35 and 36 which have on their ends hooks 37 and 38 respectively. Once the connection of the upper ends of the straps is made, the lower hooks 37 and 38 are pulled down tight against the action of the spring and over the lower edge of the trunk cover. The same arrangement of springs is provided upon both straps. A tension spring 39 ties the springs 36 of each strap together.

As shown in Fig. 4, a holder for an advertising sign or for a license tag and as indicated at 40 is connected to the straps by rivets 41. On the back of the holder 40 are brackets 42 to which there are respectively connected braces 43 that are in turn respectively riveted by rivets 44 to the straps 30 and 31. Suction cups 45 are respectively provided on the lower ends of the straps 30 and 31. On the lower ends of the straps as shown in Figs. 4 and 5, elastic strips 17 and 21 respectively, as shown in Fig. 1, are used instead of the springs as shown in Fig. 2.

In Fig. 3, there is shown a still further form of the invention wherein the advertising sign holder, as indicated at 46, is of slightly different shape, but is similarly connected to straps 47 and 48 as above described. The lower ends of the straps have single tension spring devices 49 and 50 respectively connected with them and these devices are connected respectively by hooks 51 and 52 to the lower edge of the trunk cover.

In Fig. 6, there is shown on the straps felt or rubber strip 53 serving as a liner for the under side of the strap 30. All of the top straps are curved to conform to the shape of the trunk cover.

In Fig. 7, there is shown a form of the invention where the connection of the straps is effected through hook portions 55 and 56 integral with the ends of a strap 57. The lower hook 56 extends downwardly over the edge of the trunk cover and holder plate 58 is connected at its lower edge to the strap 57 adjacent the hook 56 as by welding or any other suitable means. The connection is effected as indicated at 59. Rigid brackets 60 are connected between the inner face of the plate 58 and the strips 57. Where the sign is to be more permanent, this form of the invention is used.

While various changes may be made in the detail construction, it shall be understood that such changes shall be within the spirit and scope of the present invention as defined by the appended claim.

Having thus set forth and disclosed the nature of my invention, what is claimed is:

An advertising sign holder arrangement adapted to be connected to the trunk cover of an automobile comprising straps having hook formations on their upper ends fitting over the upper edge of the trunk cover, expandable means connected to the lower end of each strap and having hooks thereon adapted to engage with the lower edge of the trunk cover, a plate welded to the straps adjacent its lower end and a bracing means extending between the plate and the straps to support the plate in a substantially vertical position, and spring tie means extending between the expandable means of the respective straps whereby to hold the straps against separation.

JOHN E. DIENES.

REFERENCES CITED

The following references are of record in the file of this patent:

UNITED STATES PATENTS

| Number | Name | Date |
|---|---|---|
| 1,942,444 | O'Connor | Jan. 9, 1934 |
| 2,301,834 | Whaley | Nov. 10, 1942 |